(12) United States Patent
Begen et al.

(10) Patent No.: US 8,812,621 B2
(45) Date of Patent: Aug. 19, 2014

(54) REDUCING FETCHING LOAD ON CACHE SERVERS IN ADAPTIVE STREAMING

(75) Inventors: Ali C. Begen, London (CA); Mark Baugher, Portland, OR (US); Francois Le Faucheur, Valbonne (FR); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 232 days.

(21) Appl. No.: 13/099,934

(22) Filed: May 3, 2011

(65) Prior Publication Data

US 2012/0284371 A1 Nov. 8, 2012

(51) Int. Cl.
G06F 15/16 (2006.01)
(52) U.S. Cl.
USPC ........................................... 709/219
(58) Field of Classification Search
USPC .......... 709/203, 229, 231; 370/338, 203, 229, 370/231; 340/901
See application file for complete search history.

(56) References Cited

U.S. PATENT DOCUMENTS

| | | | |
|---|---|---|---|
| 7,676,591 B2 * | 3/2010 | Chan et al. ..................... | 709/231 |
| 7,991,883 B1 * | 8/2011 | Streeter et al. ................ | 709/224 |
| 8,209,539 B2 * | 6/2012 | Baudry et al. ................. | 713/178 |
| 2006/0184684 A1 * | 8/2006 | Weiss et al. .................... | 709/231 |
| 2008/0077701 A1 * | 3/2008 | Kongalath et al. ............. | 709/232 |
| 2008/0316052 A1 * | 12/2008 | Ruffini .......................... | 340/901 |
| 2009/0083279 A1 * | 3/2009 | Hasek ............................ | 707/10 |
| 2009/0282492 A1 * | 11/2009 | Takahashi ....................... | 726/27 |
| 2010/0111059 A1 * | 5/2010 | Bappu et al. ................... | 370/338 |
| 2010/0257322 A1 * | 10/2010 | Isherwood et al. ............. | 711/141 |
| 2011/0307781 A1 * | 12/2011 | Sood et al. ..................... | 715/716 |
| 2012/0083260 A1 * | 4/2012 | Arriola et al. .................. | 455/418 |

* cited by examiner

*Primary Examiner* — Tesfay Yohannes
(74) *Attorney, Agent, or Firm* — Merchant & Gould

(57) ABSTRACT

In one embodiment, a method that receives at a cache server device a request from a client device for a first representation of a content chunk; determines whether the first representation is available at the cache server device; responsive to determining that the first representation is available at the cache server device, provides the first representation to the client device; responsive to determining that the first representation is unavailable at the cache server device, determines whether a congestion-like condition is present in an upstream network; and responsive to determining that the congestion-like condition is present in the upstream network, provides a second representation of the content chunk.

14 Claims, 5 Drawing Sheets

REDUCING FETCHING LOAD ON CACHE SERVERS IN ADAPTIVE STREAMING

TECHNICAL FIELD

The present disclosure is generally related to adaptive streaming in computer networks.

BACKGROUND

Transmission of media content (e.g., video, audio, and/or data, etc., collectively or individually referred to herein also as content) between different nodes on a network may be performed in a variety of ways. The type of content that is the subject of the transfer and the underlying network conditions usually determine the methods used for communication. For instance, for a simple file transfer over a lossy network, one emphasis is on reliable delivery. The packets may be protected against losses with added redundancy or the lost packets may be recovered by retransmissions. In the case of audio/video content delivery with real-time viewing requirements, one emphasis is on low latency and efficient transmission to enable the best possible viewing experience, where occasional losses may be tolerated.

The structure of the packets and the algorithms used for real-time media transmission on a given network may collectively define a chosen media streaming protocol. Although various media streaming protocols available today differ in implementation details, they can generally be classified into two main categories: push-based protocols and pull-based protocols. In push-based streaming protocols, once a connection is established between a server (e.g., server device or server software) and a client (e.g., client device or client software), the server remains active on the session and streams packets to the client until the session is torn down or interrupted. In pull-based streaming protocols, the client is the active entity that requests the content from the server. Thus, the server response depends on the client request, where otherwise the server is idle or blocked for that client. Further, the bitrate at which the client receives the content is dependent upon the client capabilities and the available network bandwidth. As the primary download protocol of the Internet, HTTP is a common communication protocol upon which pull-based media delivery is based.

In pull-based adaptive streaming, the client makes a decision about which specific representation of any given content should be requested next from a source. Such a decision may be based on various parameters and/or observations, including the current (observed/available) bandwidth and the amount of data in a client buffer. The client may up-shift or down-shift (e.g., switch to a higher or lower bitrate) or stay at the same bitrate to provide a continuous playout at the highest quality possible. The bitrate switching decision may be revised periodically, and then a new chunk at the determined profile is requested. For instance, if the client experiences a reduction in the streaming rate, the client may decide to down-shift. However, if lower quality content is not available nearby (e.g., on a cache server), this request may result in an upstream cache fill, where the cache server requests the missing content from an upstream server. If the original congestion is in the upstream network, this down-shift process may cause performance issues.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
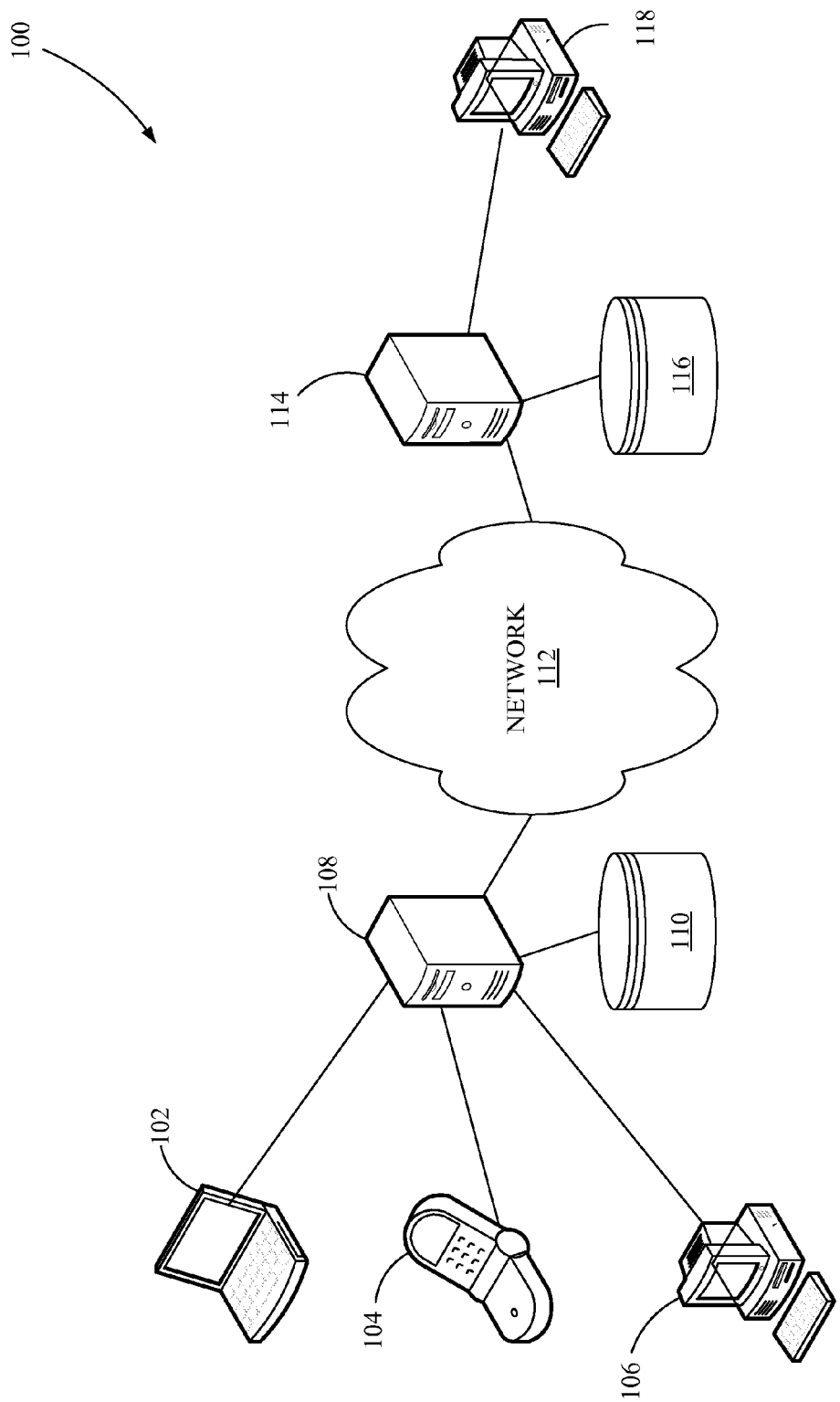
FIG. 1 is a block diagram that illustrates an example environment in which cache systems and methods can be implemented.

In one embodiment, a method that receives at a cache server device a request from a client device for a first representation of a content chunk; determines whether the first representation is available at the cache server device; responsive to determining that the first representation is available at the cache server device, provides the first representation to the client device; responsive to determining that the first representation is unavailable at the cache server device, determines whether a congestion-like condition is present in an upstream network; and responsive to determining that the congestion-like condition is present in the upstream network, provides a second representation of the content chunk.

Example Embodiments

Disclosed herein are various embodiments of cache systems and methods (herein, collectively referred to also as cache systems). In one embodiment, a cache system comprises one or more cache server devices, each cache server device implemented as part of a computer network comprising one or more client devices and one or more upstream server devices and networks, the cache server device configured to store a plurality of representations of one or more instances of media content (or simply, content, such as streaming video, audio, and/or data content, each instance of content comprising a time-shifted movie, or other time-shifted television and/or audio programming) for local, ready-access by a client device. For instance, and using bitrate as an example variable among the different representations, representation 1 of Movie A may comprise a bitrate of 200 Kbps, representation 2 of Movie A may comprise a bitrate of 400 Kbps, representation 3 of Movie A may comprise a bitrate of 1.2 Mbps, and so on. Each representation is further sub-divided into plural chunks (e.g., piece of content, where a chunk may be one or more Groups of Pictures (GoP) as known in MPEG-compatible systems, or a "fragment" in MPEG-4 systems, or other suitable sub-divisions of an entire instance of content). Using video as an example, in response to a client request for a specific representation of a given chunk of video from a client device, if the requested representation of the chunk is unavailable and there exists congestion-like conditions upstream of the cache server device, the cache server device may offer an alternative representation to the client device for the requested chunk which is already available in storage associated with the cache server device instead of trying to fetch the requested chunk from an upstream device at the risk of further delay. By providing a suitable alternative representation, the cache server device provides timely delivery of the streamed content and hence improved viewer experience.

Using a simple example, assume the client device requests chunk #2 of Movie A at 2 Mbps. Upon the cache server device determining there is upstream congestion or congestion-like conditions, and further upon determining that chunk #2 is unavailable in the requested representation, the cache server device responds with a 1.5 Mbps version of Movie A. Note that congestion or congestion-like conditions, e.g., anything that would render fetching from an upstream device a lengthy process, (hereinafter, reference to congestion and congestion-like are considered the same or similar conditions for purposes of the disclosed embodiments) may be indicated by the network (e.g., its presence and/or location in the network), and/or the cache server may review prior (e.g., recent) transfers from an upstream server(s) and determine the presence of congestion-like conditions in past transfers as a predictor of current conditions. In some embodiments, the cache server considers the availability (or lack thereof) of its own resources (e.g., remaining bandwidth on ingress interfaces, remaining bandwidth for read or write access to local storage mediums) for establishing congestion-like conditions. In some embodiments, the cache server device uses a standard "do not cache" flag (e.g., sent to the client device according to current HTTP specifications/standards) in its response to avoid potential incorrect (or inconsistent) caching in any downstream caches (e.g., cache server devices located between the responding cache server and the requesting client device). In some embodiments, provision of the "do not cache flag" is optional. Assuming the client device is configured to recognize that the chunk sent by the cache server device is not the representation requested, the client device may perform a self-adjustment (if necessary) to accommodate the unrequested version. Alternatively, the cache server device may issue a redirect to a Uniform Resource Identifier (URI) that points to the chunk at the bitrate selected by the cache server device. In other words, by sending the URI redirect, the client device makes a second request to the device directed by the cache server, hence obtaining the requested chunk representation (versus an alternative), but at the expense of delay.

In normal operation, an embodiment of the cache server device, upon receiving a request by the client device for the next chunk, readily serves the client device with the requested chunk if available. Further, in instances where the requested chunk is not available at the cache server device, and where there is no congestion-like conditions (or in some embodiments, minimal congestion-like conditions), the cache server device forwards the request to an upstream device (e.g., another cache server device or otherwise) and fetches the requested chunk from the upstream device and then serves it to the client device. However, as indicated above, if the cache server device does not have the exact requested representation but instead has a different representation for the requested chunk, the cache server device may respond with the alternative representation for implementations where congestion-like problems in the upstream direction exist. In some embodiments, the cache server device may store historical data on recent fetch or forward processing durations to predict whether current congestion-like conditions warrant the provision to the client device of the alternative representation rather than providing the requested representation with delay. In some embodiments, the client device may further assist the decision making of the cache server device by providing an indication, embedded with, or delivered in association with, the request; the indication providing an urgency level to the request. For instance, if the client device requests the representation of the chunk with a given urgency indication (e.g., toggled bit, or mask which provides a relative urgency level with respect to a threshold) that conveys to the cache server that immediacy in response is more important than meeting the specific representation request, the cache server device can respond with the alternative representation instead of fetching or forwarding (or redirecting) the requested representation to an upstream server device or devices. In some embodiments, the historical approach may be implemented along with the "urgency" indication. Thus, in general, rather than responding late, the cache server device offers an acceptable alternative on time, which may be a better approach in certain implementations, especially if the difference (e.g., from a quality and/or performance (e.g., resolution) standpoint) between the requested and offered chunk is not large.

These and other embodiments and/or other features are described hereinafter in the context of an example computer network environment, with content embodied as video for the sake of facilitating an understanding of the disclosure. It should be appreciated that other content, in lieu of or in addition to video, is also considered within the scope of the embodiments. Further, certain embodiments of cache systems are described below in the context of adaptive streaming in an environment that uses the Hypertext Transfer Protocol (HTTP). HTTP is a request-response standard for client-server computing. In HTTP, Web browsers act as clients, while an application running on the computer hosting the Web site and content acts as a server. HTTP uses the Transmission Control Protocol (TCP) that is part of the Internet Protocol (IP) suite of communications protocols used for the Internet and other similar networks. One having ordinary skill in the art should understand that other networks (e.g., subscriber networks) distributing multimedia (e.g., video, graphics, audio, and/or data, or otherwise referred to also herein individually or collectively as media content or simply, content) may also benefit from certain embodiments of cache systems and methods and hence are contemplated to be within the scope of the disclosure. It should be understood by one having ordinary skill in the art that, though specifics for one or more embodiments are disclosed herein, such specifics as described are not necessarily part of every embodiment.

FIG. 1 is a schematic diagram of an example environment, a computer network 100, in which certain embodiments of cache systems and methods may be implemented. It should be understood by one having ordinary skill in the art, in the context of the present disclosure, that the computer network 100 shown in FIG. 1 is merely illustrative, and should not be construed as implying any limitations upon the scope of the disclosure. The computer network 100 may comprise a plurality of individual networks, such as a wireless network and/or a wired network. The example computer network 100 depicted in FIG. 1 includes a plurality of client devices 102, 104, and 106 (e.g., wired and/or wireless devices, such as cellular phones, personal digital assistants (PDAs), computer devices or systems such as laptops, personal computers, set-top terminals, televisions with communication capabilities, DVD/CD recorders, etc.) that are in communication with one or more cache server devices, such as cache server device 108, and one or more upstream devices, such as upstream server device 114. The upstream server device 114 may comprise a cache server. Additional cache servers and other servers may be employed. The upstream server device 114 may further be coupled to other devices, such as a workstation 118. The cache server device 108 is coupled to an upstream network, such as a wide area network (WAN) 112, which in one embodiment comprises the Internet. In some embodiments, the cache server device 108 may be coupled to the client devices 102, 104, and 106 via a network, such as a local area network (LAN). Other networks are contemplated to be within the scope of the disclosure, including networks that use packets incorporated with other transport protocols or standards. The cache server device 108 and upstream server device 114 may also comprise (e.g., be integrated with), or be in local communication with, one or more storage devices, such as storage device 110 shown corresponding to cache server device 108 and storage device 116 shown corresponding to upstream server device 114.

Communication between the cache server device 108 and the client devices 102, 104, 106 may be via an internetwork of wireless or wired connections, including by way of non-limiting example Ethernet, token ring, private or proprietary networks, among others. The cache server device 108 and/or upstream server device 114 may comprise a server in an Internet Service Provider (ISP) facility, a private server, a gateway, and/or other devices or facilities used for communication of streaming video files (among other content, such as data, audio, etc.). One having ordinary skill in the art should understand that additional client devices, cache server devices, upstream server devices, and other devices, such as routers, bridges, etc., may be employed in the computer network 100. Communication of Internet Protocol (IP) packets between the client devices 102, 104, 106, the cache server device 108, and the upstream server device 114 may be implemented according to one or more of a plurality of different protocols, including Transmission Control Protocol (TCP)/IP, among others.

Figure 2:
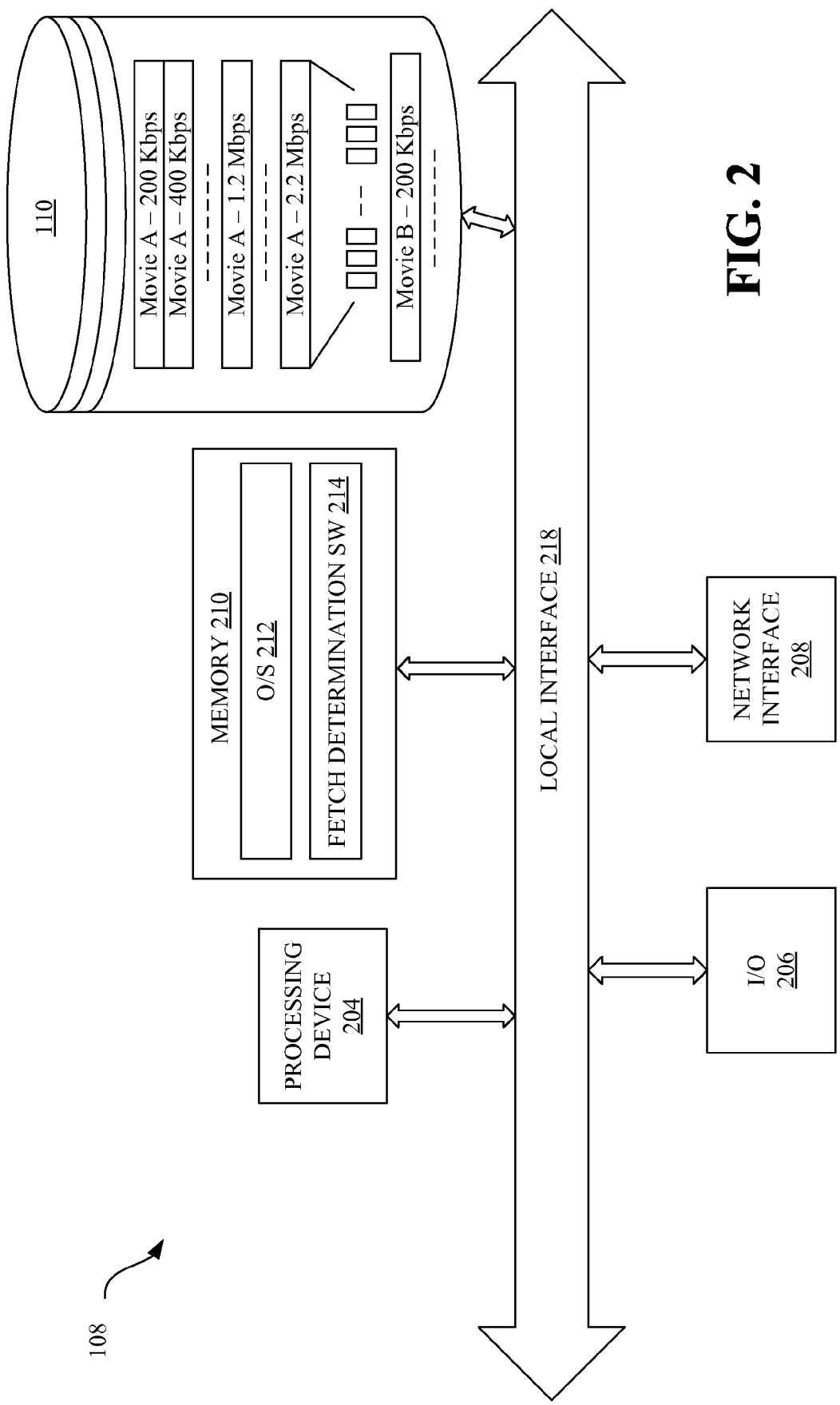
FIG. 2 is a block diagram of an embodiment of an example cache server device.

FIG. 2 is a block diagram of an embodiment of the cache server device 108. It should be understood by one having ordinary skill in the art, in the context of the present disclosure, that the cache server device 108 shown in FIG. 2 is merely illustrative, and should not be construed as implying any limitations upon the scope of the disclosure. Generally, in terms of hardware architecture, the cache server device 108 includes a processing device 204, input/output (I/O) devices 206, network interface 208, and memory 210, each of which is communicatively coupled via a local interface 218. The network interface 208 includes one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

The I/O devices 206 may include input devices, for example but not limited to, a keyboard, mouse, scanner, microphone, etc. Furthermore, the I/O devices 206 may also include output devices, for example but not limited to, a printer, display, etc.

The local interface 218 may be, for example but not limited to, one or more buses or other wired or wireless connections, as is known in the art. The local interface 218 may have additional elements, which are omitted for simplicity, such as controllers, buffers (caches), drivers, repeaters, and receivers, to enable communications. Further, the local interface 218 may include address, control, and/or data connections to enable appropriate communications among the aforementioned components. In one embodiment, the cache server device 108 is further configured with the storage device 110 coupled to the local interface 218, the storage device 110 configured to store a plurality of content and their respective chunks.

For instance, the storage device 110 stores different representations of plural movies (e.g., Movie A, Movie B, etc.). Movie A is shown in FIG. 2 as comprising one representation at 200 Kbps, another representation at 400 Kbps, and other representations at different bitrates. Though the representations are different in terms of bitrate, the representations may be different based on (in lieu of, or in addition to bitrate) other video attributes or parameters, such as frame rate, resolution, codec-specific level/profile, etc. Each content instance (illustrated only for Movie A at 2.2 Mbps, with the understanding that similar principles apply for the other stored content) could be divided into short-duration chunks (depicted in FIG. 2 as discrete blocks), each of which is encoded at the respective bitrate shown for that movie instance. Each chunk may be decoded independently of each other. When the chunks are played back (e.g., at the client device 102, 104, and/or 106), the original media stream is reconstructed in seamless fashion. During a download, the client device (e.g., using client device 102 as an example hereinafter, with the understanding that similar principles apply to the other client devices 104 and 106) dynamically picks the chunk with the proper encoding bitrate that matches or is below the available bandwidth and requests that chunk from the cache server device 108. Thus, the client device 102 can adapt its media consumption rate according to the available receive bandwidth.

Although the structure of the chunks may differ depending on the implementation, the basic principles for chunk construction remain essentially the same. In the case where audio and video are not interleaved, each audio frame generally consists of constant duration audio samples in the milliseconds range and each frame is decodable on its own for common audio codecs. Thus, audio data may easily be inserted into a chunk by combining a sufficient number of audio frames to match the chunk duration.

In contrast, for video, the frames are not necessarily independently decodable due to temporal prediction commonly applied between frames. Thus, the partitioning for chunk construction is performed, in one embodiment, at the Group of Pictures (GoP) boundary. In video coding, a GoP is a sequence of frames that start with an intra-coded frame (I frame) that may be decoded independently followed by predicted frames that depend on other frames. If the predicted frames within a GoP depend only on the frames within the same GoP, the GoP is referred to as a closed GoP. Otherwise, the GoP is referred to as an open GoP. Since a closed GoP is self-contained (e.g., can be decoded independently of other GoPs), a chunk may be constructed from a closed GoP in a straightforward manner. During encoding (e.g., at the source of the video content, such as co-located with the upstream server device 114, or in some embodiments, co-located with the cache server device 102), the number of frames in a GoP may be adjusted such that the total duration of the frames in the GoP is equal to the desired chunk duration. If a chunk duration is large compared to a typical GoP size, then one approach may be to pack more than one GoP into a chunk. The emerging MPEG DASH specification offers some discussion and examples.

In some embodiments, the storage device 110 stores the metadata needed to ensure that each chunk is independently decodable across different representations.

The processing device 204 is a hardware device for executing software, particularly that which is stored in memory 210. The processing device 204 may be any custom made or commercially available processor, a central processing unit (CPU), an auxiliary processor among several processors associated with the cache server 108, a semiconductor-based microprocessor (in the form of a microchip or chip set), a macroprocessor, or generally any device for executing software instructions.

The memory 210 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 210 may incorporate electronic, magnetic, optical, semi-conductive, and/or other types of storage media. Note that the memory 210 can have a distributed architecture, where various components are situated remotely from one another, which can be accessed by the processing device 204.

The software in memory 210 may include one or more separate programs, each of which comprises an ordered listing of executable instructions for implementing logical functions. In the embodiment shown in FIG. 2, the software in memory 210 includes a suitable operating system (O/S) 212 and a fetch determination software (SW) module 214. Note that use of the term "fetch" in the nomenclature for the software module 214 is not intended to preclude the use of other access operations, and hence the fetch, forwarding, and redirection functionality are processes contemplated to be performed by certain embodiments of the fetch determination software module 214. The operating system 212 essentially controls the execution of other computer programs, such as the fetch determination software module 214, and provides scheduling, input-output control, file and data management, memory management, and communication control and related services.

Functionality of the fetch determination software module 214 may be implemented using a single module, or distributed among a plurality of modules. The fetch determination software module 214 comprises functionality to, among others, index, manage and update the storage of different representations of content, respond to requests from the client devices 102 (and similarly, client devices 104, 106), such as forwarding, redirecting, and/or fetching requested representations of a chunk from upstream, make determinations about upstream congestion-like conditions, and evaluate the suitability of alternate representations based on a client request and make a selection thereof.

When the fetch determination software module 214 is in operation, the processing device 204 is configured to execute the fetch determination software module 214 stored within the memory 210, to communicate data to and from the memory 210, and to generally control operations of the fetch determination software module 214. The fetch determination software module 214 and the O/S 212, in whole or in part, but typically the latter, are read by the processing device 204, perhaps buffered within the processing device 204, and then executed.

Figure 3:
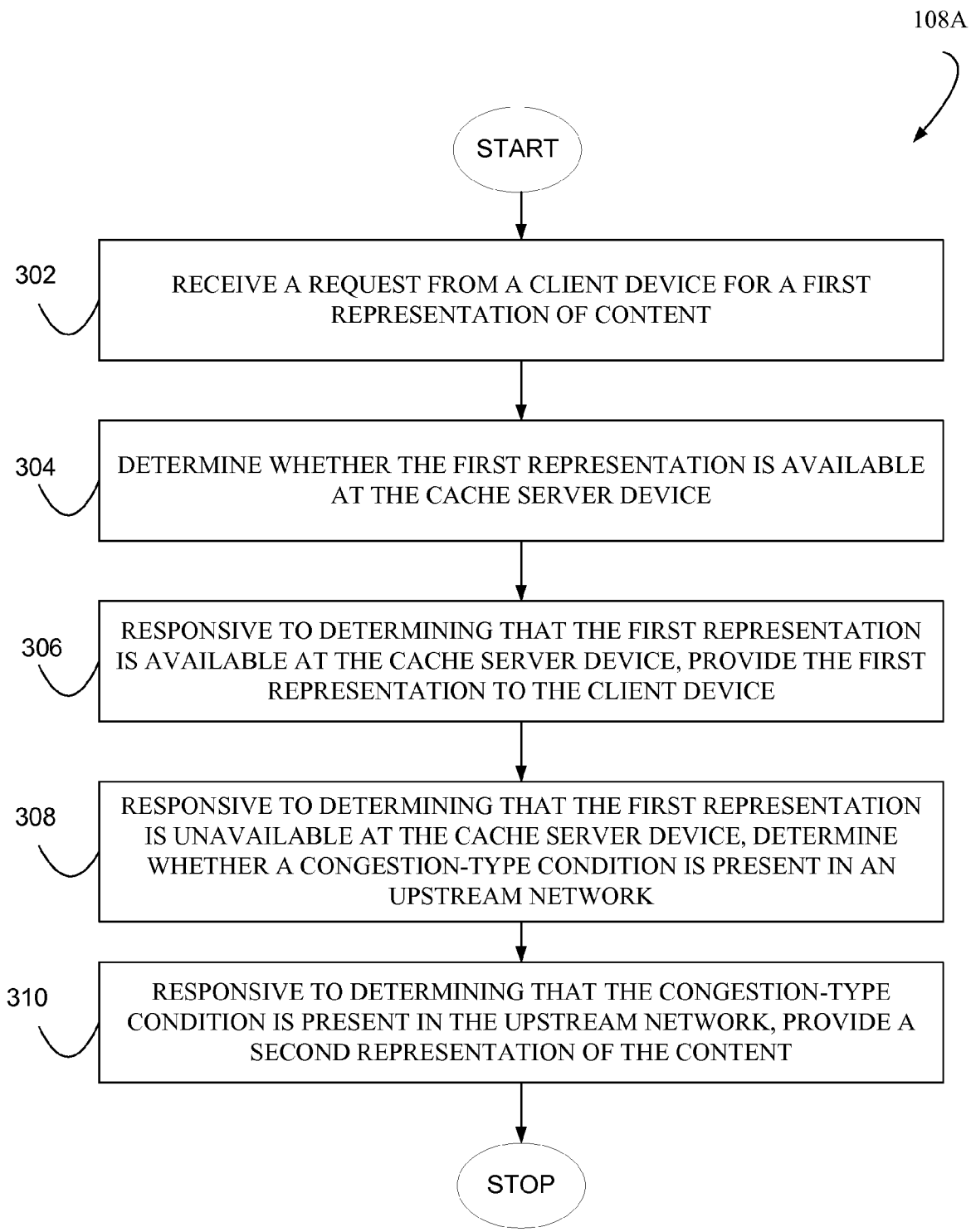
FIG. 3 is a flow diagram that illustrates an embodiment of a method for reducing the fetching load on a cache server device.

Having described an embodiment of an example cache server device 108, attention is directed to FIG. 3, which is a flow diagram that illustrates an example method (denoted with reference numeral 108A) implemented in one embodiment by the cache server device 108 (e.g., by the fetch determination software module 214 in cooperation with other components of the cache server device 108, such as the network interface 208, operating system 212, and processing device 204). The method 108A comprises receiving a request from the client device for a first representation of a content chunk (302); determining whether the first representation is available at the cache server device (304); responsive to determining that the first representation is available at the cache server device, providing the first representation to the client device (306); responsive to determining that the first representation is unavailable at the cache server device, determining whether a congestion-like condition is present in an upstream network (308); and responsive to determining that the congestion-like condition is present in the upstream network, providing a second representation of the video chunk (310).

Figure 4:
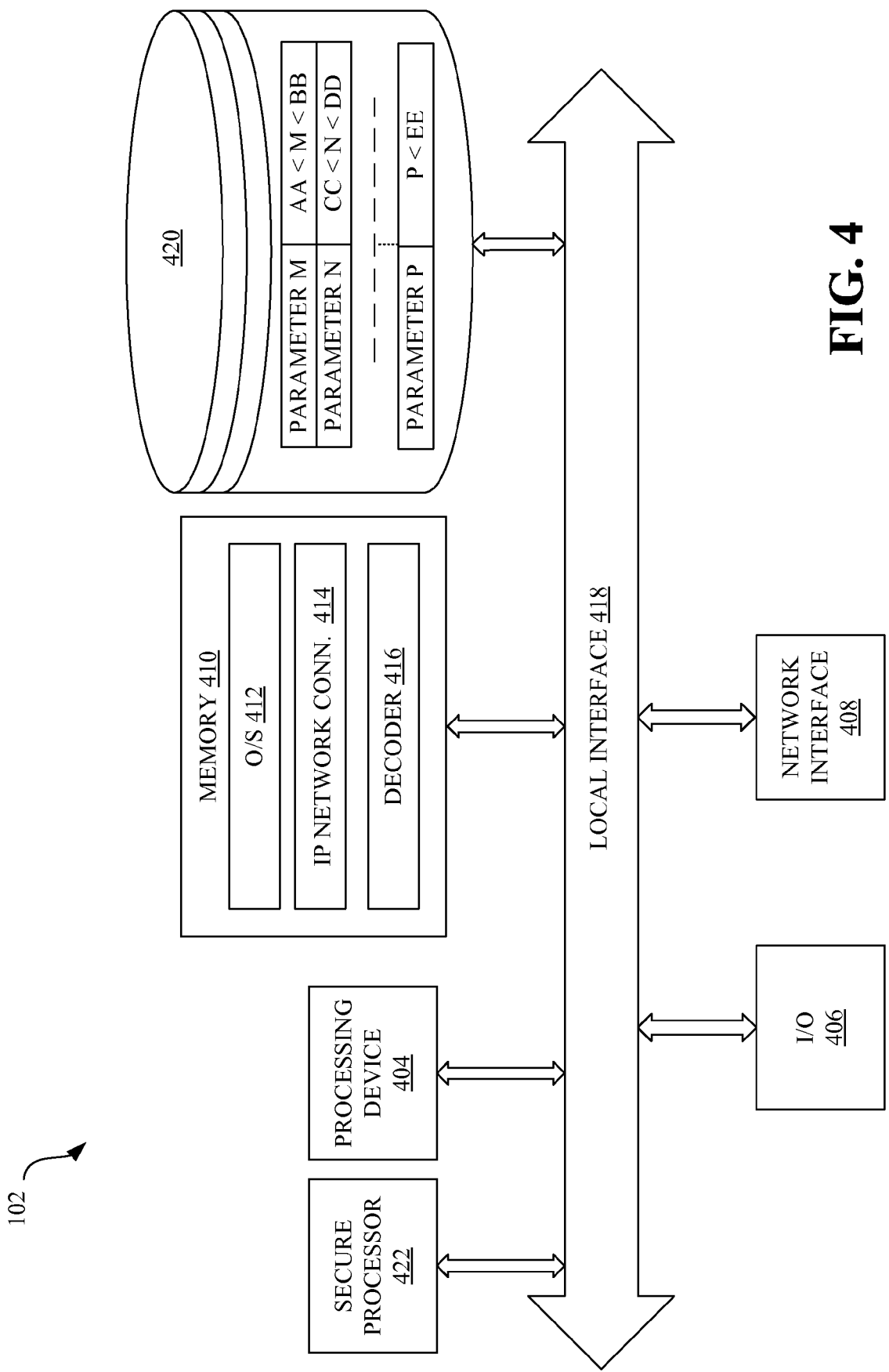
FIG. 4 is a block diagram of an embodiment of an example client device.

Attention is directed now to FIG. 4, which illustrates an embodiment of an example client device, such as client device 102. It should be understood by one having ordinary skill in the art, in the context of the present disclosure, that the client device 102 shown in FIG. 4 is merely illustrative, and should not be construed as implying any limitations upon the scope of the disclosure. As indicated above, similar principles of operation as further described below apply to the other client devices 104 and 106, and hence discussion for those specific devices is omitted for brevity. The client device 102 comprises a processing device 404, I/O device 406, network interface 408, and memory 410 (comprising an O/S 412), coupled to one another via a local interface 418. The components 404, 406, 408, 410, 412, and 418 are similar to the components of the same label having reference numerals 204, 206, 208, 210, 212, and 218 shown in FIG. 2 (and hence operate with the same or similar functionality), and hence discussion of the same is omitted here for brevity. The client device 102 may further comprise a persistent (e.g., magnetic or semi-conductor based) storage device 420 and secure processor 424 for use in providing decryption functionality as is known to those having ordinary skill in the art.

The memory 410 further comprises an IP network connection module 414 and a decoder module 416. In some embodiments, encoding functionality may also be stored in memory 410 (or implemented in hardware in some embodiments), such as for storage of decompressed and then client device-compressed content to the storage device 420. The decoder 416 comprises functionality to perform decompression of compressed video, as is known to those having ordinary skill in the art. In some embodiments, decoding functionality may be combined with encoding functionality (e.g., in a codec). With regard to the IP network connection module 414, the IP network connection module 414 comprises functionality to perform communications with upstream devices according to one of a plurality of IP communication protocols, such as TCP/IP protocol. For instance, the IP network connection module 414 may request chunks according to HTTP, FTP, among other file transfer requests. In some embodiments, the IP connection module 414 may request chunks, at least in part, according to known, industry-standard specifications, such as according to MPEG-4 extensions or ISO/IEC 13818-1 MPEG-2 Transport Stream file formats. In some embodiments, proprietary mechanisms may be employed. As indicated above, the requests may further comprise an indication of the urgency of the request and/or suitable alternatives (the latter described further below).

In some embodiments, the request issued by the client device 102 may comprise information about alternative representations suitable for processing, such as to address circumstances where the requested representation of a chunk is unavailable at the cache server 108 and upstream congestion-like conditions exist that exasperate delays (should a fetch or forwarding of the request be instantiated). As depicted in FIG. 4, the storage device 420 (or memory 410 in some embodiments) may comprise a data structure (e.g., table) that lists suitable ranges for various video stream parameters or attributes, such as bitrate, resolution, etc. The ranges, generically illustrated in FIG. 4, may be low-to-high types of ranges (e.g., AA<M<<BB, where M may comprise bitrate, and AA may be a lowest allowable bitrate value and BB may be a highest allowable bitrate value), or not-to-exceed type of range (e.g., parameter P<EE), among other techniques (e.g., not-to-go below, etc.). For instance, using the bitrate example, when the client device 102 requests a chunk at a bitrate of R1, any alternative representation at a bitrate of R2, where R2<R1, could be acceptable, and hence reception of an alternate representation does not introduce processing difficulties or delays at the client device 102. In other words, with such information about alternate representations residing in the client device 102, upon receipt of a packet, the client device 102 (e.g., decoder 416 and processor 404) can make processing adjustments in view of any discrepancy (e.g., difference in quality and/or performance between requested and received) and take the necessary actions.

Further, in some embodiments, the client device 102 may use such information as part of a chunk request. For instance, the client device 102 may communicate the upper bound (or range, lower bound, etc.) for one or more parameters or attributes (such as frame rate, bitrate, resolution, etc.) in the request message and the cache server device 108 or other network device may use such communicated information to provide the best response to satisfy the client device requirements. The cache server device 108 implements decision processing based on the availability of the potential chunk candidates that meet the conveyed requirements, congestion state, etc.

Other variations to a session involving the client device 102 and cache server device 108 (e.g., the requests and response) are contemplated. In some embodiments, the cache server device 108 may explicitly indicate which of the versions it actually delivered, in a form that the client can back-map to the corresponding manifest entry (e.g., via a MIME extension or an HTTP extension).

Figure 5:
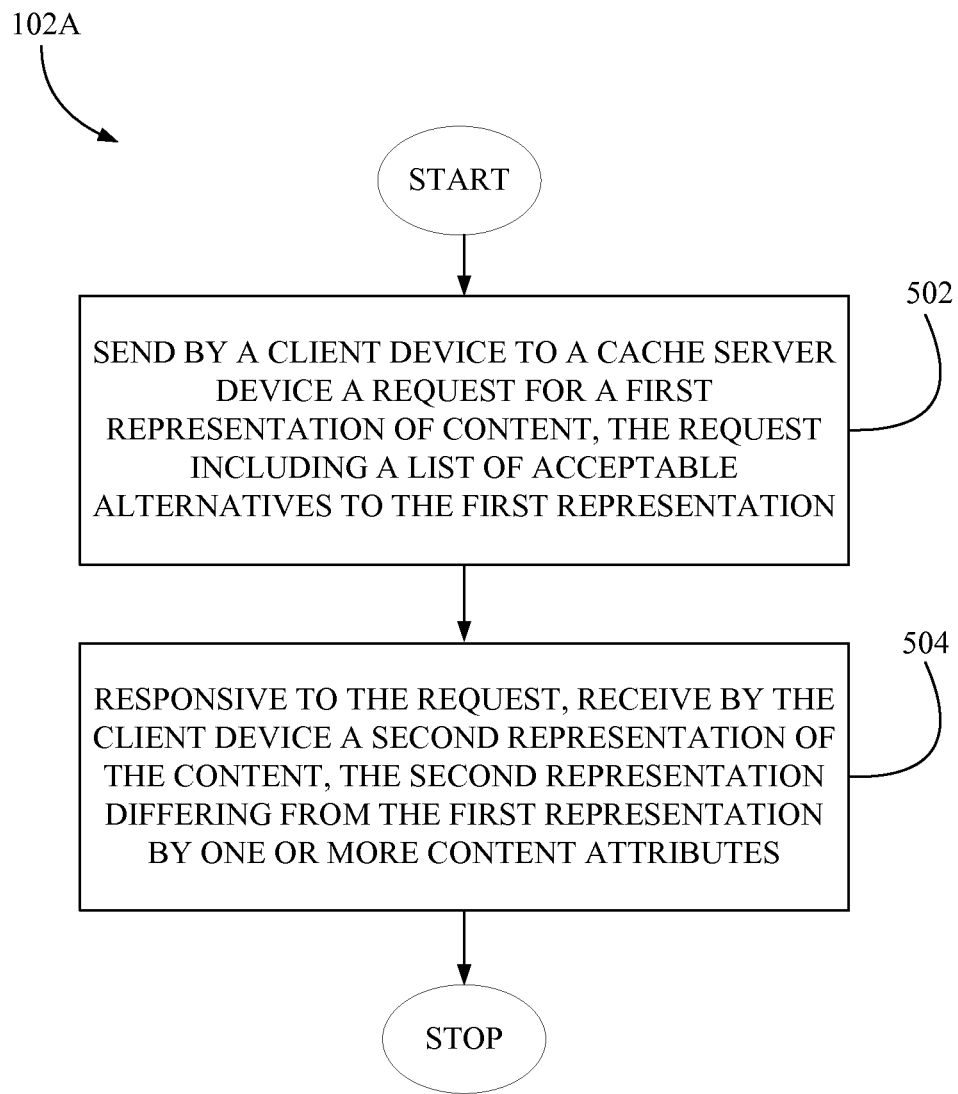
FIG. 5 is a flow diagram that illustrates an embodiment of a method for receiving an alternate representation of requested audio/video content on a client device.

Having described an example architecture for the client device 102, it should be appreciated that one method embodiment implemented by the client device 102, referenced as method 102A and shown in FIG. 5, comprises sending by a client device to a cache server device a request for a first representation of a content chunk, the request including a list of acceptable alternatives to the first representation (502); and responsive to the request, receiving by the client device a second representations of the content chunk, the second representation differing from the first representation by one or more content attributes (504).

Certain embodiments of a cache system may encompass the cache server device 108, or one or more constituent components thereof, one or more client devices 102, 104, and/or 106, and/or a combination of these devices, among others.

The fetch determination software module 214, IP network connection module 414, and decoder 416 of certain embodiments of the present disclosure can be implemented in hardware, software, firmware, or a combination thereof. In embodiments where the fetch determination software module 214, IP network connection module 414, and decoder 416 are implemented in software or firmware (collectively, software code or software logic or simply logic), as shown in FIGS. 2 and 4, such embodiments are stored in memory and executed by a suitable instruction execution system. When the fetch determination software module 214, IP network connection module 414, and decoder 416 are implemented in software, it should be noted that the fetch determination software module 214, IP network connection module 414, and decoder 416 may be stored on any computer readable medium for use by or in connection with any computer related system or method. In the context of this document, a computer readable medium is an electronic, magnetic, optical, or other physical device or means that can contain or store a computer program for use by or in connection with a computer related system or method. The fetch determination software module 214, IP network connection module 414, and decoder 416 may be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions.

In embodiments where all or a portion of the functionality of the fetch determination software module 214, IP network connection module 414, and/or decoder 416 are implemented in hardware, the fetch determination software module 214, IP network connection module 414, and decoder 416 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 3 and 5 using separate boxes can be combined.

In addition, though the various flow diagrams (e.g., shown in FIGS. 3 and 5) are shown and described in the context of the architectures shown and described in FIGS. 2 and 4, it should be understood that implementation of the methods described in FIGS. 3 and 5 are not limited to those architectures, and that the same devices or other processing devices possessing different architectures configured to implement such methods are contemplated to be within the scope of the disclosure.

It should be emphasized that the above-described embodiments of the present disclosure are merely possible examples of implementations, merely set forth for a clear understanding of the principles of the cache systems and methods. Many variations and modifications may be made to the above-described embodiment(s) without departing substantially from the spirit and principles of the disclosure. For instance, when all different representations of the same content use the same encryption key, the decryption process does not pose an extra challenge. Similarly, if a key is embedded as in MPEG2-TS, sending a different bitrate is not an issue so long as the chunks have needed initialization vector metadata downloaded with the encryption media. However, if different representations use different keys, sending a chunk at a different bitrate may require the client device 102 to change the key before decoding the associated content. One way to resolve this is to send a redirect to the client device 102 for the available chunk on the cache server device 108 and have the client device 102 request that particular chunk. Though such an implementation may add a round-trip delay, it also allows the client device 102 to use the correct keys to decrypt the content. These and other modifications and variations are intended to be included herein within the scope of this disclosure and protected by the following claims.

What is claimed is:

1. A method, comprising:
receiving at a cache server device a request from a client device for a first representation of a content chunk the request comprising a data structure that lists suitable bitrate ranges;
determining whether the first representation is available at the cache server device;
responsive to determining that the first representation is available at the cache server device, providing the first representation to the client device;
responsive to determining that the first representation is unavailable at the cache server device, determining whether a congestion condition is present in an upstream network, wherein the congestion condition comprises transmission delays longer than the first threshold; and
responsive to determining that the congestion condition is present in the upstream network, providing a second representation of the content chunk from the cache server device, wherein the second representation comprises a different bitrate than the first representation.

2. The method of claim 1, wherein responsive to determining that congestion is not present in the upstream network: fetching the first representation from an upstream device; and providing the first representation to the client device.

3. The method of claim 1, wherein the congestion condition is manifested by the cache server reviewing recent prior transfers from an upstream server(s) and determining the presence of congestion conditions, wherein the congestion conditions comprise at least delays to complete the transfers longer than some threshold, in past transfers as a predictor of current conditions.

4. The method of claim 1, wherein the congestion condition is manifested by the cache server reviewing the lack of availability of its own resources, the resources comprising at least one of: remaining bandwidth on ingress interfaces, and remaining bandwidth for read or write access to local storage mediums for establishing congestion conditions.

5. The method of claim 1, further comprising receiving an indication of urgency of the request, historical data on past request processing, or a combination of both.

6. The method of claim 1, wherein the first representation and the second representation use a different encryption key.

7. The method of claim 1, further comprising providing a redirect to the client device for available representations of the content chunk on the cache server device responsive to the presence of different representations, wherein providing the second representation is further responsive to receiving from the client device a request for the second representation.

8. The method of claim 1, wherein the chunk comprises a single Group of Pictures (GoP).

9. The method of claim 1, wherein the first representation and second representation differ by one or more content attributes and/or characteristics.

10. The method of claim 1, wherein the request further comprises a list of acceptable alternatives to the first representation, wherein the providing of the second representation of the content chunk is further responsive to consideration of the list.

11. The method of claim 1, wherein the cache server device issues a "do not cache" flag as part of the response.

12. The method of claim 1, further comprising providing an indication that explicitly affirms to the client device that the second representation is intended as the response to the request.

13. A cache server device, comprising:
a memory comprising software; and
a processor configured by the software to:
receive a request from a client device for a first representation of a content chunk the request comprising a data structure that lists suitable bitrate ranges and suitable resolution ranges;
determine whether the first representation is available at the cache server device;
responsive to determining that the first representation is available at the cache server device, provide the first representation to the client device;
responsive to determining that the first representation is unavailable at the cache server device, determine whether a congestion condition is present in an upstream network, wherein the congestion condition comprises transmission delays longer than a first threshold; and
responsive to determining that the congestion-like condition is present in the upstream network, provide a second representation of the content chunk from the cache server device, wherein the second representation comprises a different bitrate than the first representation.

14. The cache server device of claim 13, wherein the request further comprises a list of acceptable alternatives to the first representation, wherein the processor is further configured by the software to provide the second representation of the content chunk further responsive to consideration by the processor of the list.

* * * * *